UNITED STATES PATENT OFFICE.

CHARLES BURFITT, OF SURREY HOUSE, NEW WIMBLEDON, ENGLAND.

IMPROVEMENT IN COMPOSITIONS FOR REMOVING AND PREVENTING INCRUSTATION IN STEAM-BOILERS.

Specification forming part of Letters Patent No. 144,254, dated November 4, 1873; application filed July 26, 1873.

*To all whom it may concern:*

Be it known that I, CHARLES BURFITT, of Surrey House, New Wimbledon, in the county of Surrey, England, civil engineer, have made an invention for the Removal and Prevention of Incrustation in Steam-Generators; and do hereby declare the nature of the same to be as follows:

The composition is made in three different forms—that is to say, in "block," in "liquid," and in "paste."

The block composition is compounded as follows: One pound (avoirdupois) of oak-galls; one pound Australian bark; one-quarter of a pound of glue; one pound Irish moss; four gallons of filtered water; to be set by the application of 170° of heat.

Into the vessel in which the above ingredients are mixed, put a small quantity of arsenic.

The liquid composition is compounded as follows: One pound of oak-galls; one pound Australian bark; one-quarter of a pound of soda; one-half pound of Irish moss; ten gallons of filtered water. Boil for three hours.

The paste composition is compounded as follows: One pound of oak-galls; one pound of Irish moss; one pound Australian bark; one-quarter of a pound of soda; five gallons filtered water. Boil to 120°.

Add to all, by condensing, tannic acid from vegetable matter, such as potatoes, cabbage, and other vegetables of a like nature—that is to say, in the block and the liquid, half a pint tannic acid per gallon of water, and in the paste, one quart tannic acid to every gallon of water.

Having thus described my invention, I claim as new and desire to secure by Letters Patent—

A compound for removing and preventing incrustation in steam-generators, consisting of oak-galls, Australian bark, and Irish moss in about equal parts, the quantity of water and preparation being as described.

CHARLES BURFITT.

Witnesses:
   FREDK. M. H. JONES,
     138 *Leadenhall St., London, Merchant.*
   HENRY DADE,
     175 *Holloway Rd., London, Commission Merchant.*